May 20, 1930. D. M. BELL 1,759,342
INTERNAL COMBUSTION COMPRESSOR ENGINE
Filed June 11, 1928 6 Sheets-Sheet 3

INVENTOR.
David M Bell
BY
Myron J Dikeman
ATTORNEY.

Fig. 9

May 20, 1930.  D. M. BELL  1,759,342
INTERNAL COMBUSTION COMPRESSOR ENGINE
Filed June 11, 1928    6 Sheets-Sheet 6

INVENTOR.
David M Bell
BY Myron J Dikeman
ATTORNEY.

Patented May 20, 1930

1,759,342

UNITED STATES PATENT OFFICE

DAVID M. BELL, OF SANDWICH, ONTARIO, CANADA, ASSIGNOR OF ONE-HALF TO JOSEPH ALTER, OF WAYNE, MICHIGAN

INTERNAL-COMBUSTION COMPRESSOR ENGINE

Application filed June 11, 1928. Serial No. 284,455.

The object of my invention is to produce an internal combustion engine that will operate as a power unit without the requirements of the ordinary crank shaft and connecting pistons.

Another object is to produce a mechanical unit for generating power through an internal combustion power cylinder in a manner for producing high pressures and preserving the same in a reserve pressure tank.

A further object is to produce a power unit by the use of an internal combustion engine piston so constructed and operated as a compressor unit for transmitting the high cylinder pressures into a connecting reserve pressure tank.

A still further object is to produce a compressor engine that may be used with any turbine in a manner for transmitting power to various turbines through communicating pipes and without the necessity of intervening machinery.

These several objects are attained in the preferred form by the construction and arrangement of parts more fully hereinafter set forth.

Similar parts on all drawings are marked by similar numerals.

Figure 1:
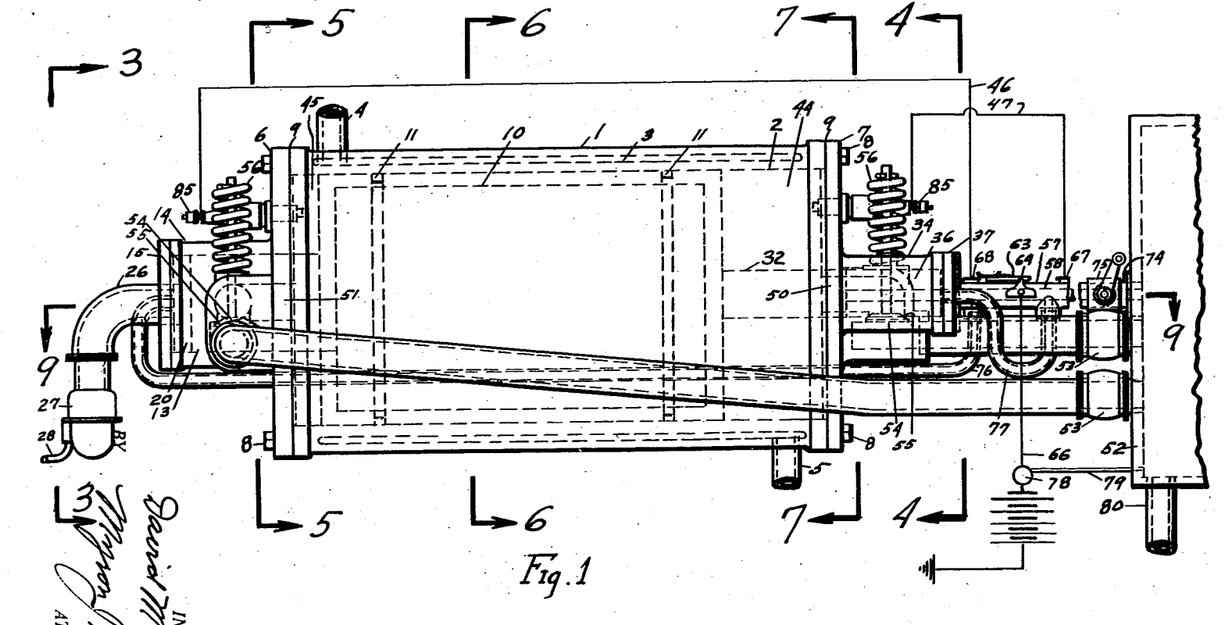
Fig. 1 is a side view of my device, showing the relative position of the exterior mechanism and connecting pipes.
Figure 2:
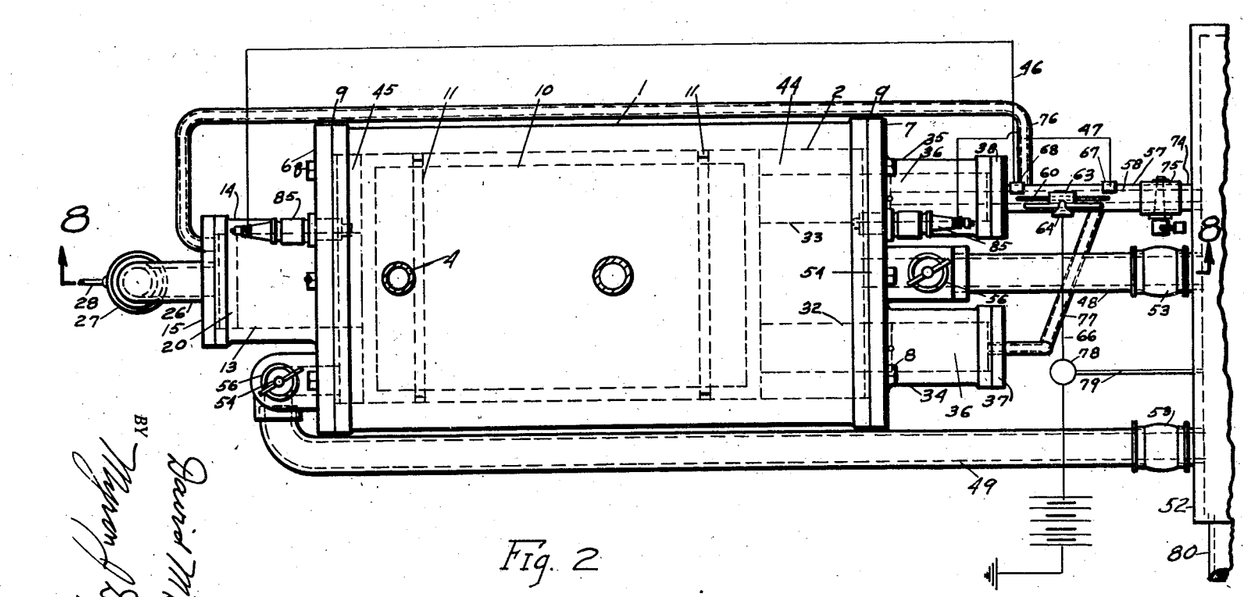
Fig. 2 is a top view of the device, showing the operating parts and the general arrangement of the operating units and connecting reserve tanks.
Figure 3:
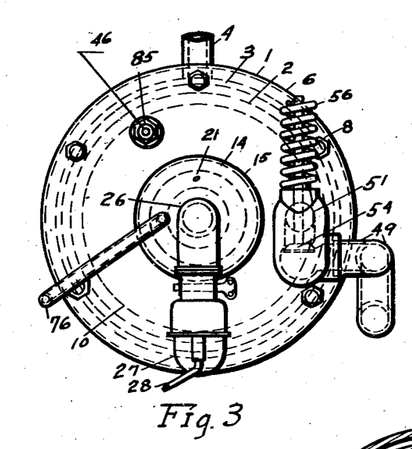
Fig. 3 is an end view of the device taken along the line 3—3 of Fig. 1, showing the intake and exhaust mechanism.
Figure 4:
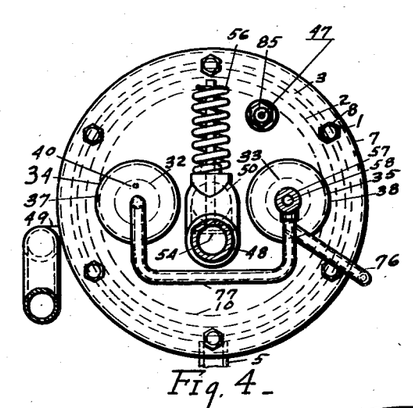
Fig. 4 is a view of the opposite end of the engine cylinder taken along the line 4—4 of Fig. 1, also showing the exhaust mechanism and operating valves.
Figure 5:
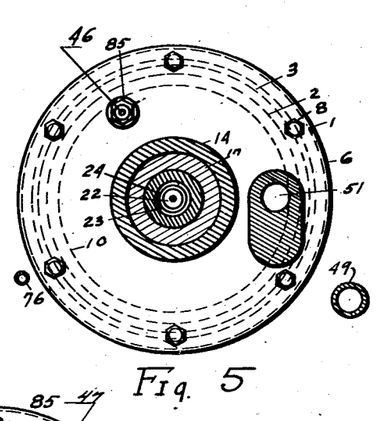
Fig. 5 is a sectional view taken along line 5—5 of Fig. 1, showing the general arrangement of the intake port valves and exhaust ports.
Figure 6:
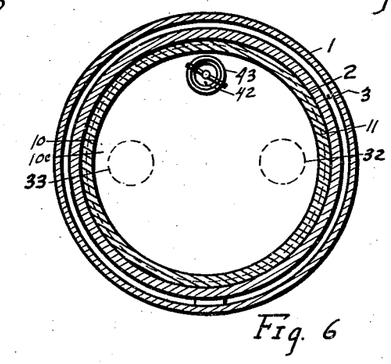
Fig. 6 is a sectional view taken along line 6—6 of Fig. 1, showing the general construction of the interior of the cylinder.
Figure 7:
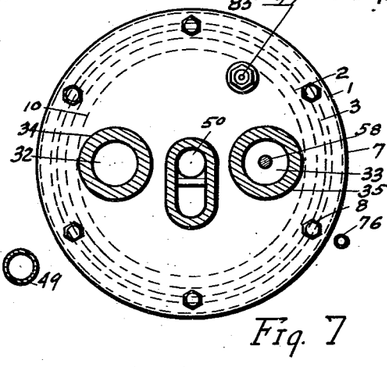
Fig. 7 is a sectional view taken along line 7—7 of Fig. 1, also showing the exhaust ports and cushion chambers.
Figure 8:
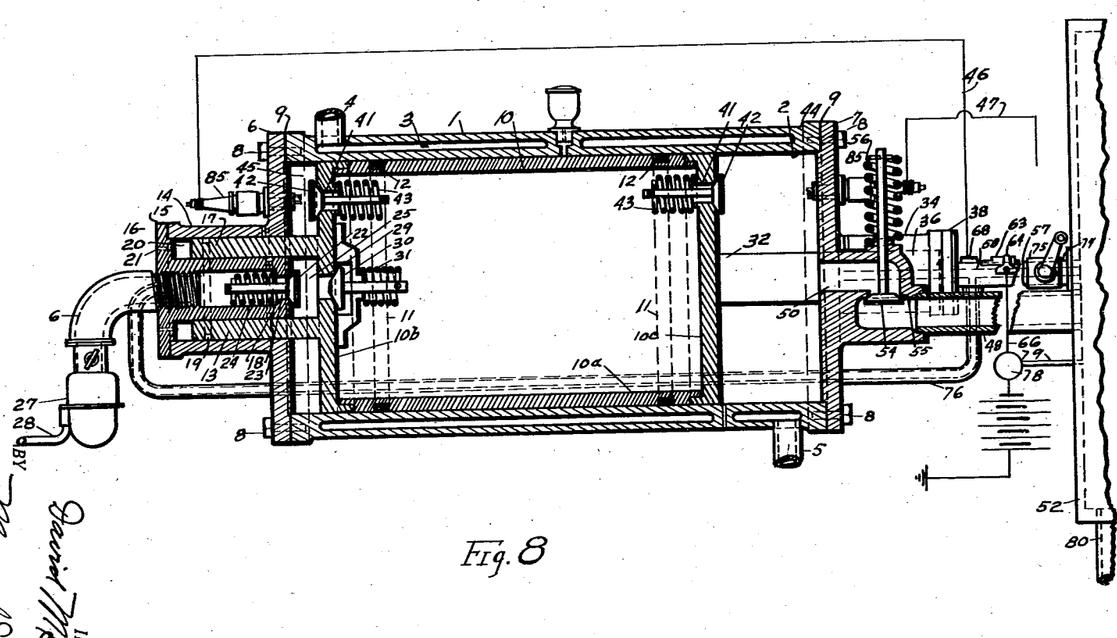
Fig. 8 is a sectional view taken along line 8—8 of Fig. 2, showing a vertical section through the engine cylinder with its operating valves and mechanism therein connected.
Figure 9:
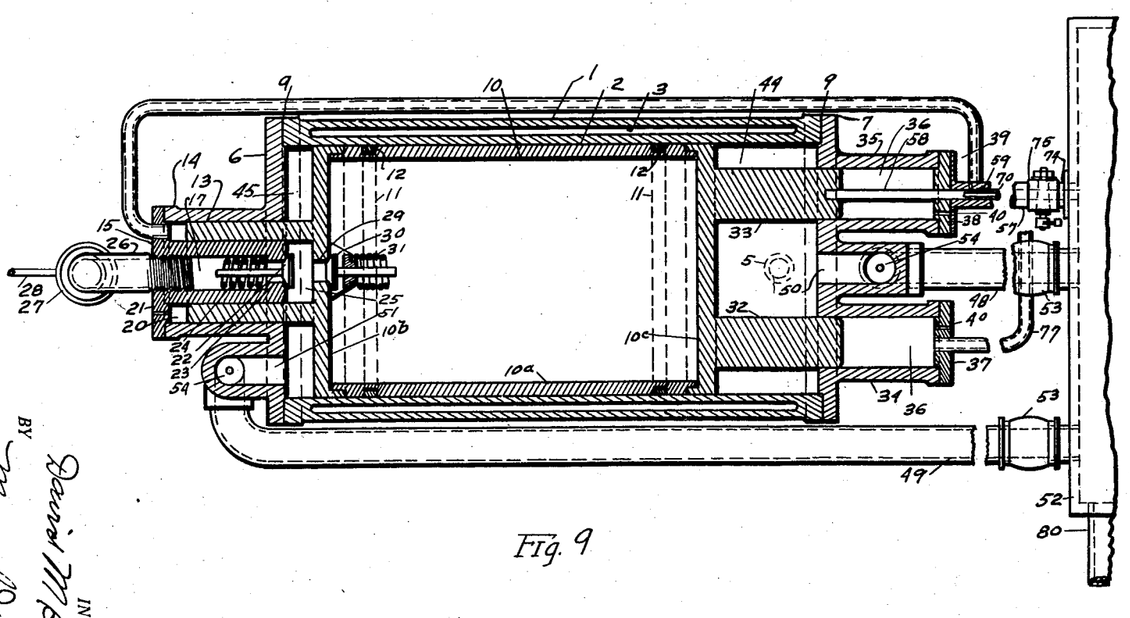
Fig. 9 is a sectional view taken along the line 9—9 of Fig. 1, showing a horizontal section through the engine cylinder and the general arrangement of the cushion chambers and operating mechanism.
Figure 10:
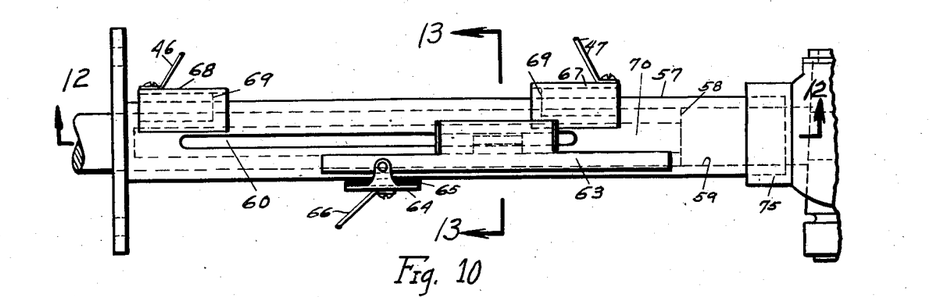
Fig. 10 is an enlarged detailed view of the starter section, showing the top exterior view and the general arrangement of the connecting ignition terminals.
Figure 11:
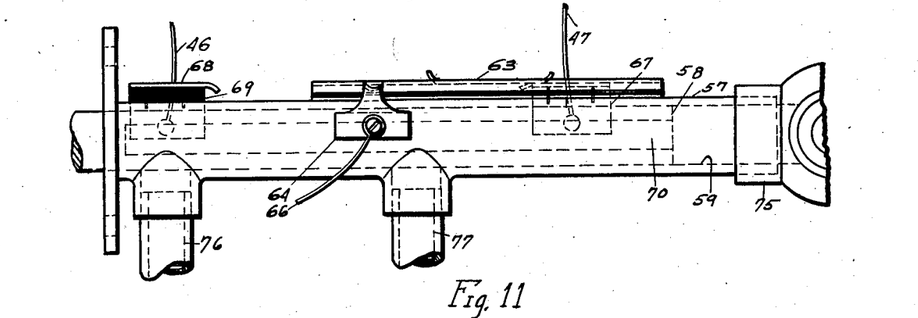
Fig. 11 is a side view of the enlarged section shown in Fig. 10, showing the relative position of the electric terminals.
Figures 12, 13:
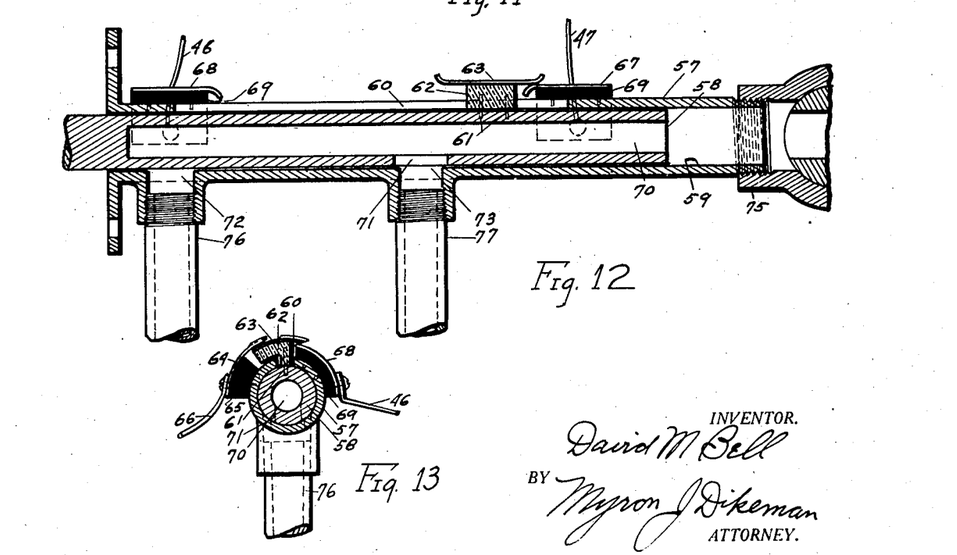
Fig. 12 is a sectional view taken on line 12—12 of Fig. 10, showing the relative position of the interior operating parts of the starter and connecting ports and means for operating the ignition terminals.
Fig. 13 is a sectional view of the starter section taken on line 13—13 of Fig. 11, showing the general arrangement of the starter mechanism and its relative position to the ignition terminals.

I will now describe more fully the detail construction of my device, referring to the drawings and the marks thereon.

In general my device comprises an ordinary internal combustion engine cylinder, closed at both ends by suitable cylinder heads and provided with a single oscillating piston placed within the cylinder, the piston being provided with the ordinary piston rings for making as nearly air tight joints with the cylinder walls as possible, yet allowing free oscillation of the piston therein. The cylinder with the connecting piston is so designed and operated as to cause successive alternative explosions of fuel gas at each end of the piston at every oscillation thereof, the mechanism being so arranged and designed as to fill the end cylinder chamber alternately and cause alternate ignition thereof as the piston oscillates within the cylinder. The high pressure generated within the end cylinder chambers, due to the ignition of the fuel gas and explosion thereof, is transmitted from the combustion chambers at each end of the cylinder into a connecting high pressure reserve tank, the engine compressor continuing to operate until a certain pressure is reached within the pressure tank, and then it is automatically disconnected. By continued oscillations and explosions the pressure within the reserve tank is raised to the desired degree and the pressure fluid therein may then be transmitted through suitable pipes to any turbine.

The casing —1— is preferably made of cast metal having required strength suitable for use with internal combustion engines and is formed with a hollow, true cylindrical wall —2— the entire length thereof. The casing —1— is provided with an interior recess water chamber —3— encircing the entire cylinder and extending nearly the entire length thereof for receiving and circulating water through the casing for cooling the unit when exposed to heat from the internal combustion of the fuel gases. The casing —1— is also provided with the inlet water pipe —4— and outlet pipe —5—, preferably connected at opposite ends and opposite sides of the casing and leading into the recess water chamber designed for flowing water therethrough by any convenient desirable means. The cylinder casing —1— is provided with the cylinder heads —6— and —7— also formed of metal and joined to the cylinder ends by tightly fitted joints and securely attached thereto by the bolts —8— which pass through the head and engage the cylinder casing walls, the joint between the cylinder head and casing being securely sealed by the gasket —9—, which provides a closed chamber cylinder having true cylindrical wall surfaces formed therein. Fitted within the cylinder casing walls —2— is a hollow piston —10—. Piston —10— is formed of a cylindrical tube —10ª— which accurately fits the chamber cylinder wall —2—, free to slide therein and is provided with two piston heads —10ᵇ— and —10ᶜ—. The piston heads —10ᵇ— and —10ᶜ— are connected to the piston tube —10ⁿ— by any convenient means for forming a rigid tight joint therewith and may be either pressed and brazed thereon or attached by means of thread connections. The piston —10— is provided with the ordinary piston rings —11— which fit within the circular grooves —12— formed around the circumference of the piston near each end thereof and are designed to secure as nearly an air tight joint with the cylinder walls as possible, the piston being free to oscillate backward and forward within the cylinder the entire length thereof. The piston head —10ᵇ— is formed with a secondary piston —13— projecting from the outer wall thereof. The said piston is hollow and open at the outer end and is positioned concentric with the axis of the piston. The cylinder head —6— is likewise formed with a corresponding secondary cylindrical chamber —14— projecting from the outer wall thereof, also concentric with the axis of the cylinder and enclosed piston, and is designed to receive and retain the secondary piston —13— therein, this piston —13— being free to oscillate the full length of the cylinder as the piston —10— oscillates within its cylindrical chamber. The walls of the secondary piston —13— and secondary cylindrical chamber —14— are to be fitted as nearly air tight as possible. A sub-cylinder head —15— is fitted and attached to the outer end of the secondary cylinder chamber —14— by the bolts —16—, forming an air tight joint therewith, and is designed to receive and resist air pressure as may be imparted thereto from the oscillating piston —13—. The sub-cylinder head —15— is formed with a fuel cylinder —17— projecting from the inner wall thereof, said fuel cylinder being turned with true cylindrical walls, positioned concentric with the axis of the cylinder casing —1— and piston —10—, and designed to fit and engage the inner recess of the hollow secondary piston —13— and to form air tight joints therewith. Both the fuel cylinder —17— and secondary piston —13— may be provided with piston rings —18— and —19— to insure tight cylinder wall joints, if desired, and increase the efficiency thereof for compression. The piston —13— compressing fluid within the secondary cylinder —14— forms a pocket —20— adjacent to the sub-cylinder head —15—, which acts as a cushion for the oscillating piston —10—, preventing metallic contact of the walls of the cylinder head and making the operating of the engine as nearly noiseless as possible. Small ports —21— are formed through the cylinder head —15—, opening into the chamber —20—, for releasing the back pressure within the sub-cylinder chamber and operate as exhaust ports. This may be varied to meet the requirements or omitted altogether in case piston rings —18— and —19— are omitted. In the inner end of the hollow fuel cylinder —17— is mounted a fuel intake valve —22— positioned concentric with the fuel port —23— formed through the end of the cylinder wall. Fuel intake valve —22— is provided with a compression spring —24— fixedly attached thereto and stressed for holding the valve —22— securely against the valve set in the end of the cylinder, the same being fitted and ground thereto to form a perfectly tight joint therewith to prevent any leaking of gas. The valve spring —24— is of sufficient strength to securely hold the intake valve —22— in place against the valve seat yet allow the valve to recede with the vacuum caused within the sub-cylinder chamber —25— when the piston —10— recedes in the opposite direction for drawing and filling the sub-cylinder chamber —25— with fresh fuel gas drawn through the intake fuel pipe —26— and carburetor —27—. The carburetor —27— may be of any standard type as is commonly used with internal combustion engines and is supplied with fuel gas through the feed pipe —28— leading thereto from any source of fuel supply such as a gasoline tank. The piston head —10$^b$— is also provided with an intake port opening —29— passing through the piston head wall and positioned concentric with the axis of the piston and leading through the sub-cylinder chamber —25—. An intake valve —30— is mounted over the port —29— on the inside wall of the piston head, positioned concentric with the intake port —29— fitted thereto to insure a perfectly air tight joint therewith. The intake valve —30— is provided with a closing coil spring —31— of sufficient strength to insure closing of the intake valve —30— on the port at all times except when subjected to external pressure from the sub-cylinder chamber —25— on its closing stroke, at which time the valve —30— will recede and admit the fuel gas within the sub-chamber —25— to the inside of the piston body to be retained therein. By successive oscillations of the piston —10— within the cylinder casing —1— the pressure of the fuel gas within the piston —10— will be raised to a high degree by the reaction of the smaller fuel cylinder —17— operating therewith. The fuel gas within the piston —10— may be maintained at any desired pre-determined pressure, depending upon the design and the relative size of the small piston to the large, which pressure will be maintained within the piston —10— during continued operations of the engine. The piston head —10$^r$— is formed with two cylindrical plungers —32— and —33— projecting from the outer wall thereof, positioned on opposite sides of the axis of the piston and parallel therewith. The cylinder head —7— is likewise provided with two projecting cylinder casings —34— and —35—, projecting from the outside wall thereof and positioned thereon concentric with and parallel to the axes of the plungers —32— and —33—, the walls of the sub-cylinders —34— and —35— being formed with true cylindrical machined surfaces for receiving and fitting the plungers —32— and —33— and forming as nearly as possible air tight joints therewith. The purpose of the plungers —32— and —33— within the cylinders —34— and —35— is to form fluid cushions for the piston —10— within the chambers —36— at the ends of the sub-cylinders and to balance and equalize with the fluid cushion pressure at the opposite end of the piston formed in chamber —20—, also for cushioning the piston —10— at both ends of its oscillation to prevent metallic contact therein with the cylinder casing or head. The sub-chambers —34— and —35— are closed with the sub-cylinder heads —37— and —38—, which form tightly fitted joints therewith, and are securely attached thereto by the bolts —39—. Small ports —40— are formed through the wall of the sub-cylinder heads —37— and —38—, for relieving the back pressure therein when the piston is operating at a high rate of oscillation and operate as exhaust ports. Formed within each of the piston heads —10$^c$— and —10$^b$— are fuel ports —41— passing through the entire piston head walls. Mounted within the ports —41— are the fuel valves —42—, positioned on the outer walls of the piston head, fitted and seated therein to form perfectly air tight joints therewith. The valves —42— are provided with valve springs —43— positioned on the inside of the piston for securely holding the fuel valve —42— firmly upon the valve seats within the ports —41—. The valve springs —43— are compression springs and are of a size and strength to exert a high pressure against the valve for securely holding the said valve in place even when the fuel gas within the piston has been raised to a high pressure through the pump action of the fuel cylinder —17—. The tension on the valve springs —43— is adjusted to withstand the pre-determined pressure required inside the piston —10—, above which they will recede and release a certain amount of fuel gas from inside the piston, discharging the same into the engine cylinder combustion chambers —44— and —45—, filling the engine combustion chamber with fuel gas at high pressure when the piston has receded to the opposite end of the engine cylinder, said fuel gas being slightly further compressed to a higher pressure on the return stroke of the piston —10— when the gas in the opposite combustion chamber is ignited and exploded. The increased pressure caused by the returning piston insures the fuel valve —42— remaining closed and sealed, while compression is taking place, and the fuel gas within the chamber is ignited when the piston compresses the same to a pre-determined point through ignition spark plugs —85—, one being mounted at each of the cylinder heads, in opposite ends of the engine cylinder. The spark plugs —85— are connected within an electric circuit through the wires —46— and —47— leading thereto and are connected with operating mechanism hereinafter described. It can readily be seen that when the fuel gas within the combustion chamber —45— is ignited the piston —10— will be forced to the opposite end of the cylinder casing —1—, compressing the fuel gas in chamber —44— to a higher pressure than imparted thereto from the piston chamber, the same being ignited by the ignition plug when the piston reaches the opposite end. The fuel gas within the piston —10— being at a high pressure will then flow freely in the combustion chamber —45— by raising the valve —42— and refilling the combustion chamber. The same operation takes place at the opposite end of the piston on the alternate structure, thus providing a continuous alternate ignition and explosion at both ends of the piston at every oscillation thereof. Exhaust outlet pipes —48— and —49— are attached to opposite ends of the cylinder and open therein through the ports —50— and —51— formed through the cylinder head walls, providing passages for the escape of the gas within the cylinder combustion chambers and the release and transmission of the high pressures therein to a connecting pressure tank —52—. The exhaust pipes —48— and —49— leading into the high pressure tank are provided with check valves —53— to prevent return of the pressure to the engine cylinder. Mounted within the exhaust ports —50— and —51— at opposite ends of the cylinder are disc exhaust valves —54—, each being fitted and seated within the S-shaped passage for securely closing the same and are securely held against the valve seats —55— by heavy coil springs —56—, the valve springs —56— being of sufficient tension to withstand the compression within the combustion chambers —44— and —45— during the piston stroke and receding only when subjected to increased pressure of the ignited fuel gas, allowing the excess pressure caused by the explosion to escape therefrom and pass through the connecting exhaust pipe into the high pressure tank —52— where it is stored, and at the same time the piston —10— recedes to the opposite end of the cylinder casing —1—, compressing the gas in the opposite combustion chamber, and bringing the piston in a position for igniting the fuel gas therein also. Alternate explosions and oscillations of the piston will cause alternate discharges of air or burned gas under high pressures through the respective exhaust pipes, both leading into the high pressure tank, and will transmit nearly all of the high pressure generated therein to the tank —52— and retain the same therein, the oscillation of the engine piston operating as a compressor, but through the action of the explosions. Means for causing alternate ignition of the fuel gas within the combustion chambers is mounted on starter casing —57— and is actuated by the plunger rod—58— mounted in the end of plunger —33— which moves with the piston —10— itself. The plunger casing —57— is cylindrical in form and is attached to the sub-cylinder head —38— and positioned concentric with the axis thereof. The plunger rod —58— passes through the hollow cylindrical recess —59— of the starter casing and fits with as nearly an air tight joint therewith as possible to prevent leaking of pressure as the rod operates therein. Through the top wall of the starter casing —57— is formed a slotted recess —60—, the said recess being of a length slightly greater than the stroke of the piston —10—. Mounted in the plunger rod —59— is an operating pin —61— which projects through the slotted recess —60— and carries mounted thereon a slide —62— of insulating material, which moves backward and forward along the casing wall as the plunger rod —58— and piston —10— oscillate. A metal contact strip —63— is fixedly attached to the top of the slide block —62— but is completely insulated from the starter casing or any connecting mechanism. A spring contact terminal —64— is mounted on the side of the starter casing —57—, completely insulated therefrom by an insulator block —65—, and engages the metal contact strip —63— at all positions thereof during sliding movement. The contact terminal —64— is connected within an electric circuit through terminal wire —66— leading therefrom. Said electric circuit may be either a battery or any other means for providing the necessary current and voltage. Fixedly mounted on the starter casing —57— at opposite ends of the slotted recess —60— are two spring spark plug terminals —67— and —68—, completely insulated from the starter casing by the insulator blocks —69—. The spring terminals —67— and —68— are positioned thereon to engage the metal contact strip —63— at the ends of the plunger's stroke and form an electric contact therewith when the piston —10— is at either end of the cylinder casing. The spring terminal —67— is connected with the circuit wire —47— leading to a spark plug in one end of the cylinder and the spring terminal —68— is connected to the circuit wire —46— leading to the spark plug at the opposite end of the cylinder, providing means for igniting the gas in the respective combustion chambers at pre-determined positions of the engine piston. The plunger rod —58— is provided with a recessed end —70— and carries an outlet port —71— formed through the bottom wall thereof. The starter casing —57— is provided with double ports —72— and —73— through the bottom walls, positioned to coincide with the port —71— in the plunger rod at the ends of the stroke in both directions. The starter casing —57— is connected with the high pressure tank by a pipe —74— and valve —75—, which allow the pressure from the tank 52 to be transmitted to the hollow recess —70— of the plunger rod when the valve —75— is opened, causing the plunger rod to recede against the high pressure imparted thereto until the port —71— coincides with port —72— of the casing. A pressure pipe —76— is attached to the casing at port —72— and leads to the opposite end of the cylinder and is communicated to the cylinder chamber —20— through the opening in the sub-cylinder head —15—, causing a high pressure therein and forcing the piston —10— to the opposite end of the cylinder casing —1— and at the same time forcing the port —71— over the casing port —73— the fluid being exhausted from the chamber —20— through the ports —21—. Likewise a pressure pipe —77— is connected to the casing over port —73— leading into the plunger chamber —36— through the sub-cylinder head —37—, allowing the high pressure to be imparted thereto and forcing the piston —10— to the opposite end the fluid being exhausted from the chamber —36— through the port —40— and at the same time reopening the port —72— which will continue to oscillate the piston —10— directly from the tank pressure until sufficient gas pressure has been created within piston —10— to start ignition within the combustion chambers —44— and —45— and thereafter the oscillation of the piston will continue by the ignition explosions. The starting mechanism may be disconnected by closing the valve —75—. The engine will continue operation under its own power until the current is disconnected through a switch —78— placed within the terminal wire —66— leading from the electric circuit. The pressure within the tank —52— may then be conveyed to any type of turbine through the pipes —80—, and may be conducted and regulated by any suitable means.

Having fully described my internal combustion compressor engine, what I claim as my invention and desire to secure by Letters Patent is:

1. An internal combustion compressor engine adapted for producing high pressures within a connected reserve tank used in combination therewith, comprising a cylinder casing, said cylinder casing being closed at both ends and provided with means for cooling, a hollow cylindrical piston, also closed at both ends, but having an inlet valve in one end thereof with means for injecting fuel gas therein, and outlet valves at both ends of said piston, accurately fitted within the cylinder casing and free to oscillate therein, forming a fuel combustion chamber at each end of the cylinder, said cylinder being provided with recess pockets formed in each end thereof, said piston being provided with cylindrical projections to fit the cylinder recess pockets and slide therein during the oscillating movement of the piston for forming air cushions at each end of the piston stroke, means mounted at one end of the cylinder for injecting fuel gas within the hollow piston at high pressure during the oscillating stroke, means mounted at each end of the piston for injecting fuel gas at high pressure alternately into the said combustion chambers, ignition means mounted at each end of the cylinder and projecting within the respective cylinder combustion chambers, said ignition means being provided with mechanism suitable for causing alternate explosions of the fuel gas within the said combustion chamber as the piston compresses the fuel gas therein, outlet exhaust ports mounted at each end of the cylinder casing and provided with pressure controlled valves for preventing escape of the cylinder pressure until after the ignition has taken place therein, exhaust pipes mounted within each of the exhaust ports and connected to a high pressure reserve tank for conducting the gas at high pressure from each of the cylinder combustion chambers directly to the high pressure tank.

2. An internal combustion compressor engine adapted for producing high pressure within a connected pressure reserve tank used in combination therewith, comprising a hollow cylinder casing closed at both ends, said casing being formed with means for cooling same when exposed to heat temperatures, a hollow cylindrical piston, closed at both ends, fitted within said cylinder casing and free to oscillate therein, forming a combustion chamber at each end of the cylinder, said cylinder casing being formed with a sub-cylinder projecting from one end thereof, a secondary piston mounted on the end of the hollow cylindrical piston, positioned to fit and engage the sub-cylinder chamber and slide therein, a passage formed through the head of the said sub-cylinder chamber within the secondary piston for injecting fuel gas therein, and an outlet valve mounted at each end of the piston for allowing the fuel gas therein to pass alternately to the end combustion chambers, ignition means mounted within each end of the cylinder for igniting the fuel gas alternately in each of the said combustion chambers as the piston compresses the same therein, an exhaust port and valve mounted at each end of the cylinder, an exhaust pipe connected to each of the said exhaust ports for conducting the ignited gas at high pressure from the respective combustion chambers directly to the high pressure tank.

3. An internal combustion compressor engine adapted for producing high pressures within a connected pressure reserve tank used in combination therewith, comprising a hollow cylinder casing, closed at both ends, a hollow cylindrical piston, also closed at both ends, accurately fitted within said cylinder and free to oscillate therein, forming a fuel combustion chamber at each end of the said cylinder, a compound sub-cylinder mounted on one end of the said cylinder and positioned concentric with the axis thereof, a hollow secondary piston mounted on the corresponding end of the enclosed piston, positioned to engage and fit the compound sub-cylinder, a fuel intake pipe entered within the said compound sub-cylinder and means for injecting fuel gas therein, said sub-cylinder being provided with an inlet valve for allowing fuel gas to enter the sub-cylinder chamber inside the hollow secondary piston, an outlet valve mounted within the piston for allowing the said fuel gas to be forced inside the piston at high pressure during the oscillation of the piston within the cylinder, outlet fuel valves mounted at each end of the piston for allowing the escape of fuel gas therein alternately into the engine combustion chambers as the piston oscillates therein, spark ignition means at each end of the cylinder and projecting into the respective combustion chambers, provided with means for causing ignition of the fuel gas alternately in the respective chambers as the oscillating piston compresses the fuel gas therein, an exhaust port and valve mounted on each end of the cylinder head, said ports leading directly into the combustion chambers, said valves being of sufficient strength to prevent escape of pressure from the combustion chambers until after the ignition of the fuel gas, exhaust pipes connected to the said exhaust ports leading directly into the high pressure tank for conducting the gas at high pressure thereto, and means mounted within said exhaust pipes for preventing the high pressure from the reserve tank being transmitted back to the engine cylinder.

4. An internal combustion compressor engine adapted for producing high pressures within a connected reserve tank used in combination therewith, comprising a cylinder casing, closed at both ends, a hollow piston, also closed at both ends, accurately fitted within the cylinder and free to oscillate therein, forming ignition chambers at both ends thereof, a compound sub-cylinder mounted on one end of the said cylinder and a secondary piston mounted on the corresponding end of the hollow piston, positioned to engage and fit the circular recess within the compound sub-cylinder, a gasoline intake channel formed through the center of the said sub-cylinder head leading within the hollow secondary piston and means mounted therein for injecting fuel gas therein, an outlet valve positioned at the bottom of the fuel intake channel for admitting fuel gas within the said sub-cylinder chamber as the piston recedes therefrom, an outlet valve formed in the end of the piston leading into the sub-cylinder chamber for admitting the fuel gas within the piston from the sub-cylinder chamber when compressed on the return stroke thereof for producing high pressure within said piston, an outlet valve mounted at each end of the said piston for allowing the fuel gas to escape alternately into the respective end cylinder combustion chambers as the piston oscillates, spark ignition means mounted in each end of the cylinder entering the combustion chamber, mechanical means connected to said spark ignition means for causing spark and ignition of the fuel gas alternately within the respective combustion chambers as the fuel gas is compressed therein by the oscillating piston, an exhaust port mounted at each end of the cylindrical opening into the respective chambers, an exhaust pressure valve mounted within each of the exhaust ports to prevent escape of cylinder pressure except at the time of the explosion of the cylinder gases, an exhaust pipe mounted in each of the exhaust ports leading to a high pressure tank for conducting the gas at high pressure after the ignition directly into the high pressure tank, a check valve mounted in each of the exhaust pipes to prevent the return of the tank pressure to the piston, secondary plunger chambers mounted on the end of the cylinder opposite the compound sub-cylinder and plungers mounted on the corresponding end of the piston for fitting and engaging therewith, forming cushion pockets for the oscillating piston, and means for conducting tank pressure alternately to each end of the piston for producing primary piston oscillations and to operate as a mechanical starter.

In witness whereof I sign these specifications.

DAVID M. BELL.